United States Patent [19]

Chomet

[11] Patent Number: 5,790,268
[45] Date of Patent: Aug. 4, 1998

[54] FM BROADCAST FAX SYSTEM

[75] Inventor: Marc Chomet, Huntington, N.Y.

[73] Assignee: Intra-Video, Inc., New York, N.Y.

[21] Appl. No.: 567,849

[22] Filed: Dec. 6, 1995

[51] Int. Cl.$^6$ .................................................. H04N 1/32
[52] U.S. Cl. ........................ 358/442; 358/407; 358/434; 358/468
[58] Field of Search ............................ 358/442, 468, 358/407, 400, 434, 435, 444; 379/58, 100, 61, 59, 93, 97, 98, 100.01; 370/428, 94.1, 95.1, 110.1; 455/32.1, 412, 403, 550, 557; 340/825.44

[56] References Cited

U.S. PATENT DOCUMENTS

| | | | |
|---|---|---|---|
| 4,837,812 | 6/1989 | Takahashi et al. | 379/100 |
| 4,881,129 | 11/1989 | Mitsukashi et al. | 358/434 |
| 5,263,078 | 11/1993 | Takahashi et al. | 379/58 |
| 5,282,238 | 1/1994 | Berland | 379/58 |
| 5,299,024 | 3/1994 | Kafri | 358/442 |
| 5,367,564 | 11/1994 | Sutoh et al. | 358/407 |
| 5,369,501 | 11/1994 | Wilson et al. | 358/407 |
| 5,410,417 | 4/1995 | Kuznicki et al. | 358/444 |
| 5,452,106 | 9/1995 | Perkins | 358/442 |
| 5,463,477 | 10/1995 | Kakizaki | 358/442 |
| 5,463,626 | 10/1995 | Hoff et al. | 370/412 |
| 5,467,199 | 11/1995 | Mikami et al. | 358/435 |
| 5,509,050 | 4/1996 | Berland | 379/58 |
| 5,537,220 | 7/1996 | Ezumi et al. | 358/442 |
| 5,537,458 | 7/1996 | Suomi et al. | 379/59 |
| 5,608,545 | 3/1997 | Kagawa | 358/442 |

*Primary Examiner*—Edward L. Coles
*Assistant Examiner*—Cheukfan Lee
*Attorney, Agent, or Firm*—Eliot S. Gerber

[57] ABSTRACT

A subscriber broadcast system broadcasts encrypted fax (facsimile) messages on an FM subcarrier. The subcarrier is received by an FM data receiver which includes an FM receiver tuned to a selected FM subcarrier, a subcarrier detector and a demodulator. A fax message, having the subscriber's address, is received, decrypted, and stored in memory. When the subscriber's fax machine is not busy, i.e., not receiving a fax over a telephone line, the FM data receiver transmits handshake signals and then transmits the stored fax message to the subscriber's fax machine.

5 Claims, 1 Drawing Sheet

FM BROADCAST FAX SYSTEM

FIELD OF THE INVENTION

The present invention relates to radio broadcast systems and more particularly to a radio broadcast system which broadcasts digital signals to radio receivers connected as the input to fax machines.

BACKGROUND OF THE INVENTION

At the present time "fax" machines (facsimile receivers) are widely used to reproduce text and pictures on paper (hard copy), i.e., to transmit a "fax". For example, a page of a document may be inserted into a transmitting fax machine, transmitted over a telephone line, and reproduced on paper by a receiving fax machine. In addition, fax machines may be programmed to automatically transmit a document to a list of receiver fax machines. Generally, such transmissions are effected by the fax machine automatically, in sequence, dialing the first fax machine on a list and transmitting the document, then dialing the next fax machine on the list and transmitting the same document, etc. That procedure is costly in terms of telephone toll charges, since each fax transmission is a separate telephone call. It is also time-consuming since each call, for even one page, may take a minute, so it may take an hour to send a one-page fax to 60 recipients. If the phone line of a recipient is busy (engaged on another all) or impaired (for example, out of paper) it is necessary for the fax program to recognize the busy signal and recall that number, i.e., move the busy number down the list of numbers to be called. If the information must be current or instantaneous, for example, the trade price of a commodity future, a sequential calling system is useless since it takes too long to transmit information.

Various "niche" broadcast systems now exist which broadcast data, for a fee, to customers. For example, almost current (20 minute delay) stock market quotes are broadcast, using FM (Frequency Modulation), to subscribing customers who receive the quotes on an FM receiver which reproduces the stock market quotes on a screen. If the user has a computer connected to the receiver, the user may print out the screen information on paper using a printer connected to the computer. This type of system may require a dedicated computer and printer.

U.S. Pat. 5,299,018 relates to "fax cards" which operatively interconnect with personal computers. Such fax cards can transmit images stored in the computer's memory and can receive fax images and store them in the computer's memory. Different fax cards store images differently, for example, run length encoded format (CCITT G3 format), or partly decode the G3 encoded format, or completely decode the G3 format and store it in a bit-map format.

U.S. Pat. 5,146,489 refers to various problems which are encountered when a fax machine is used on a non-dedicated telephone line, i.e., a line which is also used for voice calls. It seeks to permit a user to verbally answer an incoming telephone call without disrupting the "handshake procedure" (exchange of data) between the transmitting and receiving fax machines.

U.S. Pat. 4,933,770 entitled "Radio Fax Transmission", incorporated by reference herein, discloses a converter for coupling a fax machine (called a FAX) to a single side band radio transmitter. Apparently a dedicated fax machine is used along with each transmitter-receiver. It is a two-way system in which two fax machines communicate to, and from, each other.

In U.S. Pat. 5,299,024 to Kafri, incorporated by reference herein, entitled "Method And Apparatus For Broadcasting And Receiving Broadcasted Information", a fax machine is connected to an interface which is connected to a radio receiver. Apparently it is a dedicated fax machine which can only be used to receive the broadcast signals. The handshake signals and "ring code" (end code) are broadcast. The ring code is not a subscriber's address; but is the type of broadcast. A subscriber is issued a chip, or smart card, having a ring code and/or selection code, which may be changed, for example, annually. At column 4, line 9 et seq., the '024 patent explains that the receiver transmits acoustic signals to a pick-up microphone, which implies use of the entire bandwidth at some broadcast frequency.

SUMMARY OF THE INVENTION

In accordance with the present invention there is provided a broadcast fax system for transmitting fax messages to users or subscribers.

A document is read by a fax machine and converted to digital electrical signals. Those signals may be encrypted (scrambled) to insure privacy. They are then broadcast on a subcarrier of a normal FM broadcast. Such subcarriers are often unused.

The subcarrier is received by a new type of "data receiver" which has been pre-tuned to the subcarrier frequency. The "data receiver" is the combination, in one device, (i) an FM radio receiver circuit to receive the subcarrier broadcast and having a subcarrier detector. By demodulation, it produces an output signal which is the fax message, in the same format as if that message had been received over a telephone line; (ii) digital memory to store the fax message, preferably in a data memory sufficient for the storing format, i.e., about 2 Kilobytes per page; and (iii) a fax interface which is connected by a wire to a fax machine and generates, and receives, handshake signals and, upon receipt of the acknowledged handshake signal, retrieves the fax message from memory and transmits it to its connected fax machine.

The broadcast preferably may be at a higher rate than the normal fax rate and is converted to the standard rate before, or after, being stored in the data memory. A header on the broadcast designates the data receivers, i.e., one or a list, for whom the fax message is intended.

OBJECTIVES AND FEATURES OF THE INVENTION

It is an objective of the present invention to broadcast data to subscribers using a part of the broadcast spectrum which is available but often unused, namely, a side-band subcarrier of a conventional FM broadcast with the FM broadcast being used for its usual purpose of broadcasting music, etc., and without adverse effects on such normal broadcasting.

It is a further objective of the present invention to provide a broadcast-receiver system using conventional widely available and widely used fax machines, without retrofitting or changes to such fax machines.

It is a further objective of the present invention to permit normal usage of the fax machine. The fax machine is connected to the user's telephone line, dedicated or non-dedicated, and receives fax messages over that line in the normal way.

It is a further objective of the present invention that the radio data receiver may receive instantaneous data, as broadcast, and store it, if the fax machine is busy on another call or is out of paper.

BRIEF DESCRIPTION OF THE DRAWINGS

Other objectives and features of the present invention will be apparent from the following detailed description, which should be taken in conjunction with the accompanying drawings.

In the drawings.

DETAILED DESCRIPTION OF THE INVENTION

Figure 1:
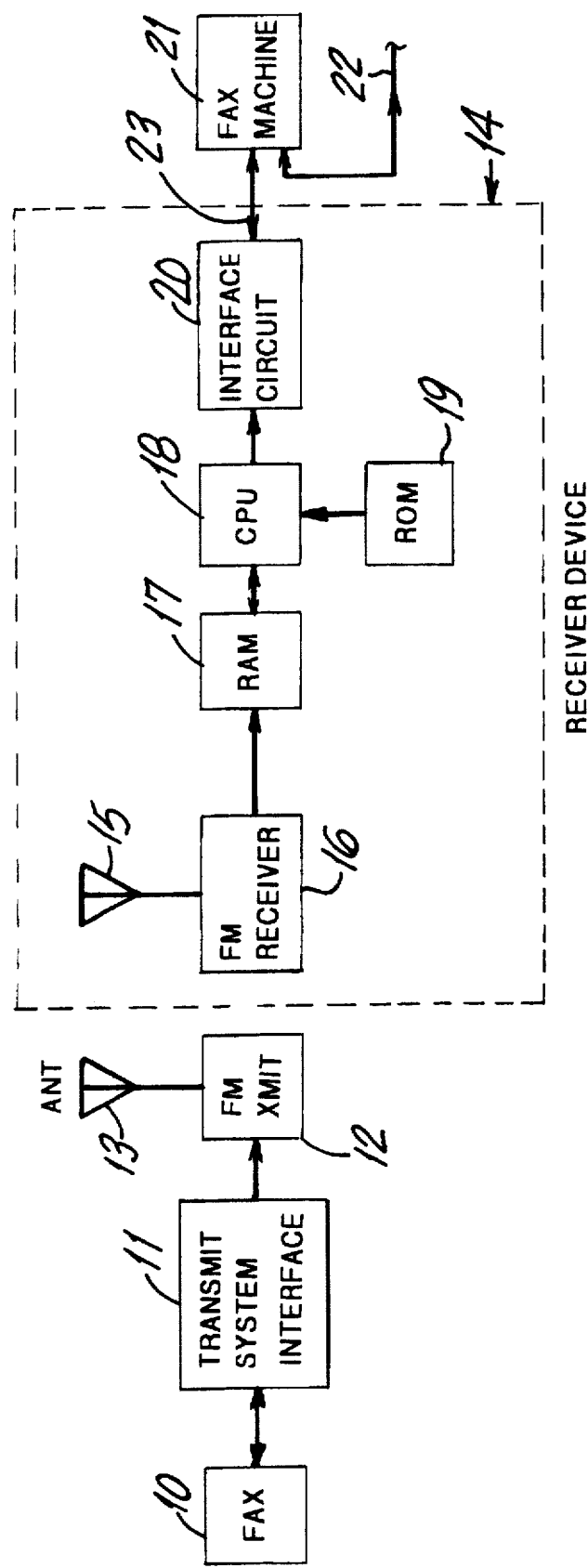
FIG. 1 is a block diagram of the system of the present invention.

As shown in FIG. 1, the system includes an originating fax machine 10, which may be at a radio broadcast site or at another site and its output transmitted to the radio broadcast site. The fax machine 10 is connected to a transmit system interface 11 which converts the fax data from fax machine 10 into an FM signal, as explained below. The FM signal is broadcast, over the air, by FM transmitter 12 and antenna 13, on an FM subcarrier. The broadcast FM subcarrier is received by the data receiver device 14 of the present invention.

That data receiver device 14 comprises an antenna 15, an FM receiver 16 having a subcarrier detector and a tuner tuned to the broadcast subcarrier, a RAM 17 (Random Access Memory), a CPU 18 (Central Processing Unit), a ROM 19 (Read Only Memory) programmed to operate the CPU 18, and an interface circuit 20. The system also includes the subscriber's fax machine 21.

The system uses FM subcarrier transmission to broadcast fax (facsimile) messages to subscribers. An FM subcarrier may be used to transmit data, voice or music simultaneous with the transmission of the normal FM voice or music transmission by an FM broadcasting station.

FM (Frequency Modulation) is defined in terms of a generalized concept called "instantaneous frequency" which is directly proportional to the time rate of change of the angle of a sine function, the argument of which is a function of time. If the argument is in radians, time in seconds; the instantaneous frequency in hertz is the time rate of change of the angle divided by 2 pi. In FM the instantaneous frequency is linearly proportional to the magnitude of the modulating wave. Consequently, louder tones mean greater changes in frequency without changing peak power.

If C is the carrier frequency, for example, 1,000,000 Hz, and V is the modulating signal frequency (a single tone in this example at 1000 Hz), then the lower side band frequencies (subcarriers) are C–V, C–2 V, C–3 V, etc., and the upper side frequencies band are C+V, C+2 V, C+3 V, etc. The sidebands (subcarriers) are unsymmetrical about the carrier. FM is used above 25 MHz (25 Megahertz) and is used for FM broadcasting in the 88–108 MHz band. Using 200 kHz channel spacing permits 100 allocable channels with an audio range of 50–15,000 Hz subcarriers.

The transmitting fax machine 10 and the receiving fax machine 21 are conventional fax machines (facsimile machines) and are sold by various companies including Brother (TM), Cannon (TM), Murita (TM), A.T.& T. (TM), etc. Generally the receiver fax machine 21 will be one that is already owned by the subscriber. It will be simultaneously used as the fax machine 21, in the system of FIG. 1, and also connected to the subscriber's telephone line 22 to receive, and transmit, fax messages in the normal usage of such fax machines. The fax machine 21 is equipped with a telephone line double-input single-output plug. The normal telephone line 22 and line 23 from interface circuit 20 are connected as inputs into the double-input plug and its output is to the fax machine 21.

The data receiver device 14 is preferably in a single housing and antenna 15 is a conventional FM receiver antenna. The FM receiver is a special receiver only in that it is tuned to the specific subcarrier used for the system of FIG. 1. The RAM 17 (Random Access Memory) is of sufficient size to contain, preferably, at least 5 pages of text. Preferably it is of at least 8 MB (megabyte) capacity.

The CPU (Central Processing Unit) may be relatively slow and low in cost, for example, an Intel (TM) 386 or a Motorola (TM) 8088.

The ROM 19 (Read Only Memory), which is programmed to operate the receiver device, may be relatively small and low in cost, for example, 27C256, a one time programmable ROM capable of storing 256 bytes. The ROM may be combined with the CPU on a single chip (integrated circuit). The interface circuit 20 generates the "handshake" signals and housekeeping signals under control by CPU 18.

The CPU 18 has an associated program in ROM 19 that provides the instructions for simulating the necessary handshaking and housekeeping signals to the fax machine. The CPU 18 interprets the digital data that is received from FM receiver 16 and extracts and compares the address of the subscriber. If the address is correct, it continues to function. If the address is incorrect, the CPU 18 purges the RAM 17 (Random Access Memory) and waits for the next transmission.

Preferably each FM transmission has a header that is interpreted by the CPU 18. This permits the system to address an individual subscriber or a group of subscribers or an entire subscriber list.

Further, the use of encryption schemes, well known to the state of the art, may prevent unauthorized reception of the messages. Various data encryption methods may be used. For example, security (scrambling) and billing methods used for subscription TV may be employed. Such systems are available from TV converter box companies such as General Instrument and Scientific Atlanta. An encrypting binary coded) system is shown in Teleglobe U.S. Pat. 4,115,807 and 4,068,264, incorporated by reference herein.

An encrypted message is received and stored in one section RAM 17. It is then decrypted, under ROM 19 control, by the CPU 18 and the decrypted message is stored in a second section of RAM 17 awaiting transmission to the fax machine 21.

What is claimed is:

1. A radio broadcast facsimile (fax)system comprising:

(a) a fax machine means to generate signals representing a fax message, code means to generate digital code representing a subscribers address, frequency modulation (FM) means to generate a FM subcarrier, modulation means to modulate the FM subcarrier with the signals representing the fax message and code, FM broadcast means to broadcast the modulated FM subcarrier;

(b) a first housing and therein a non-dedicated fax machine connected to a telephone line to receive fax messages over the telephone line;

(c) a second housing and therein an FM fax receiver means having a subcarrier detector to receive the modulated FM subcarrier, demodulate the FM subcarrier, and separate the fax message and code therefrom, and if the receiver means is addressed by the code, to store the fax message in memory, generate fax handshake signals , determine if the fax machine is busy, and transmit the fax message to the fax machine in exchange of handshake signals only if the fax machine is not busy.

2. A radio broadcast facsimile (fax) system as in claim 1 wherein the FM fax receiver means comprises an FM antenna, an FM radio receiver, a RAM (Random Access Memory), a CPU (Central Processing Unit), a programmed ROM (Read Only Memory), and wherein the CPU is being controlled by the ROM and the RAM stores fax messages.

3. A radio broadcast facsimile (fax) system in which fax messages and coded subscriber addresses are broadcast on a frequency modulation (FM) sideband to subscribers and the fax messages are reproduced on a non-dedicated fax machine which is connected to a telephone line in a housing separate from the fax machine:

(a) FM fax receiver means, including an FM antenna and an FM radio receiver, to receive the FM broadcast and output the fax message and address;

(b) address recognition means, including a CPU (Central Processing Unit) to be responsive only if the broadcast address is the address of the subscriber;

(c) computer memory mens to store the fax message under control of the CPU;

(d) a ROM (Read Only Memory) means which is programmed to control the CPU for recognition of a subscriber's address , means to determine if the fax machine is busy, and means to transmit the fax message from the RAM only if the fax machine is not busy.

4. A radio broadcast facsimile (fax) system as in claim 3 and further including a housing containing the FM receiver means, address recognition means, computer memory means and ROM, and further including a telephone jack connected to the CPU and to the fax machine.

5. A radio broadcast facsimile (fax) system as in claim 3 and a two-input one-output telephone jack connected as the input jack to the fax machine.

* * * * *